US012756235B2

(12) United States Patent
Shin et al.

(10) Patent No.: US 12,756,235 B2
(45) Date of Patent: Oct. 6, 2026

(54) ELECTRONIC DEVICE AND WIRELESS POWER TRANSMISSION/RECEPTION METHOD IN ELECTRONIC DEVICE

(71) Applicant: Samsung Electronics Co., Ltd., Suwon-si (KR)

(72) Inventors: Seungshik Shin, Suwon-si (KR); Baewon Park, Suwon-si (KR); Jinsik Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1147 days.

(21) Appl. No.: 17/843,294

(22) Filed: Jun. 17, 2022

(65) Prior Publication Data

US 2023/0007875 A1 Jan. 12, 2023

Related U.S. Application Data

(63) Continuation of application No. PCT/KR2022/008190, filed on Jun. 10, 2022.

(30) Foreign Application Priority Data

Jun. 30, 2021 (KR) ........................ 10-2021-0085672

(51) Int. Cl.
*H02J 50/12* (2016.01)
*H02J 7/80* (2026.01)
(Continued)

(52) U.S. Cl.
CPC ................ *H02J 50/12* (2016.02); *H02J 7/80* (2026.01); *H02J 7/933* (2026.01); *H02J 50/402* (2020.01)

(58) Field of Classification Search
CPC ....................................................... H02J 50/12
See application file for complete search history.

(56) References Cited

U.S. PATENT DOCUMENTS 9,502,922 B2 * 11/2016 Hasegawa ............. H01M 10/46
9,589,720 B2 * 3/2017 Akahane ................. H01F 38/14
(Continued)

FOREIGN PATENT DOCUMENTS

CN 109861353 A 6/2019
EP 3 145 049 A1 3/2017
(Continued)

OTHER PUBLICATIONS

International Search Report dated Sep. 27, 2022, issued in an International Application No. PCT/KR2022/008190.
(Continued)

*Primary Examiner* — Tynese V Mcdaniel
(74) *Attorney, Agent, or Firm* — Jefferson IP Law, LLP

(57) ABSTRACT

An electronic device may include a battery, a multi-coil circuit including a first coil, a second coil, and a switch circuit connected between the first coil and the second coil, a wireless power transmission and reception circuit electrically connected to the multi-coil circuit, a power management module electrically connected to the battery and the wireless power transmission and reception circuit, and a processor electrically connected to the multi-coil circuit, the wireless power transmission and reception circuit, and the power management module, the switch circuit receives a first control signal based on a voltage detected from the second coil, a second control signal by the processor, and a third control signal by the wireless power transmission and reception circuit, and performs a switch-ON operation or a switch-OFF operation based on at least some of the first control signal, the second control signal, and the third control signal.

20 Claims, 10 Drawing Sheets

(51) Int. Cl.

| | |
|---|---|
| ***H02J 7/90*** | (2026.01) |
| ***H02J 50/40*** | (2016.01) |

(56) References Cited

U.S. PATENT DOCUMENTS

| | | | | |
|---|---|---|---|---|
| 10,523,276 | B2 * | 12/2019 | Stone | H04B 5/79 |
| 10,965,157 | B2 * | 3/2021 | Lee | H02J 50/80 |
| 12,334,747 | B2 * | 6/2025 | Wu | H02J 50/12 |
| 2005/0180177 | A1 * | 8/2005 | Taurand | H01F 38/14 363/21.01 |
| 2011/0163714 | A1 * | 7/2011 | Ettes | H02J 7/50 320/108 |
| 2012/0025761 | A1 * | 2/2012 | Takada | B60L 53/122 320/108 |
| 2012/0038220 | A1 * | 2/2012 | Kim | H04B 5/79 307/104 |
| 2012/0139358 | A1 * | 6/2012 | Teggatz | H04B 5/263 307/104 |
| 2012/0175967 | A1 * | 7/2012 | Dibben | B60L 53/126 307/104 |
| 2013/0033228 | A1 * | 2/2013 | Raedy | B60L 53/126 320/108 |
| 2013/0221913 | A1 * | 8/2013 | Kim | H02J 7/731 320/108 |
| 2014/0113689 | A1 * | 4/2014 | Lee | H01M 10/44 455/573 |
| 2015/0171519 | A1 * | 6/2015 | Han | H02J 50/10 343/720 |
| 2015/0318735 | A1 * | 11/2015 | Jeong | H02J 50/12 320/108 |
| 2015/0340873 | A1 * | 11/2015 | Lee | H02J 50/12 307/104 |
| 2016/0149416 | A1 * | 5/2016 | Ha | H02J 7/42 307/104 |
| 2016/0309418 | A1 * | 10/2016 | Sedzin | H02J 50/60 |
| 2017/0093223 | A1 | 3/2017 | Kai et al. | |
| 2017/0133889 | A1 * | 5/2017 | Yeo | H02J 50/12 |
| 2017/0288463 | A1 * | 10/2017 | Nakahara | H02J 50/70 |
| 2017/0324147 | A1 * | 11/2017 | Lee | H04B 5/43 |
| 2017/0361725 | A1 * | 12/2017 | Seong | B60L 53/38 |
| 2018/0212475 | A1 * | 7/2018 | Noh | H01Q 1/22 |
| 2018/0219427 | A1 * | 8/2018 | Baek | H04B 5/79 |
| 2018/0226815 | A1 * | 8/2018 | Yamanishi | H02J 7/70 |
| 2018/0278099 | A1 * | 9/2018 | Hong | H02J 50/90 |
| 2018/0294681 | A1 * | 10/2018 | Bae | H02J 50/70 |
| 2018/0316226 | A1 * | 11/2018 | Jung | H02J 50/05 |
| 2019/0013691 | A1 | 1/2019 | Oshima et al. | |
| 2019/0118657 | A1 | 4/2019 | Wang et al. | |
| 2019/0123588 | A1 * | 4/2019 | Kim | H02J 50/005 |
| 2019/0124727 | A1 * | 4/2019 | Moon | H05B 6/062 |
| 2019/0252923 | A1 * | 8/2019 | Hemphill | H01F 27/28 |
| 2019/0260235 | A1 * | 8/2019 | Hemphill | H02J 50/12 |
| 2019/0372228 | A1 * | 12/2019 | Lee | H04B 5/43 |
| 2020/0186033 | A1 * | 6/2020 | Lee | H02M 7/06 |
| 2022/0352757 | A1 * | 11/2022 | Shin | H01Q 1/38 |
| 2022/0368170 | A1 * | 11/2022 | Shin | H02J 50/12 |
| 2023/0268771 | A1 * | 8/2023 | Shin | H02J 50/10 |
| 2024/0348107 | A1 * | 10/2024 | Shin | H02J 7/02 |
| 2025/0007313 | A1 * | 1/2025 | Song | H02J 7/06 |
| 2025/0183727 | A1 * | 6/2025 | Park | H02J 50/10 |

FOREIGN PATENT DOCUMENTS

| | | | |
|---|---|---|---|
| EP | 3 907 850 | A1 | 11/2021 |
| JP | 2016-010170 | A | 1/2016 |
| KR | 10-2013-0099699 | A | 9/2013 |
| KR | 10-2014-0050518 | A | 4/2014 |
| KR | 10-2015-0134107 | A | 12/2015 |
| KR | 10-2016-0028537 | A | 3/2016 |
| KR | 10-2019-0061359 | A | 6/2019 |
| KR | 10-2019-0091994 | A | 8/2019 |
| KR | 10-2022-0009772 | A | 1/2022 |
| KR | 10-2022-0109850 | A | 8/2022 |
| KR | 10-2022-0120925 | A | 8/2022 |
| WO | 2015/173923 | A1 | 11/2015 |
| WO | 2022/240187 | A1 | 11/2022 |

OTHER PUBLICATIONS

Partial Supplementary European Search Report dated Mar. 4, 2025, issued in European Patent Application No. 22833439.7.

Extended European Search Report dated Jul. 3, 2025, issued in European Patent Application No. 22833439.7.

Korean Office Action dated Jul. 2, 2022, issued in Korean Patent Application No. 10-2021-0085672.

* cited by examiner

| | |
|---|---|
| ① | Switch_EN : H && WPT_EN L |
| ② | Switch_EN : L |
| ③ | WPT_EN : L |
| ④ | Detect V_det Trigger |
| ⑤ | Switch_EN : H ‖ WPT_EN H |
| ⑥ | Switch_EN : L |

ELECTRONIC DEVICE AND WIRELESS POWER TRANSMISSION/RECEPTION METHOD IN ELECTRONIC DEVICE

CROSS-REFERENCE TO RELATED APPLICATION(S)

This application is a continuation application, claiming priority under § 365(c), of an International application No. PCT/KR2022/008190, filed on Jun. 10, 2022, which is based on and claims the benefit of a Korean patent application number 10-2021-0085672, filed on Jun. 30, 2021, in the Korean Intellectual Property Office, the disclosure of which is incorporated by reference herein in its entirety,

FIELD

The disclosure relates to an electronic device and a wireless power transmission/reception method in an electronic device.

DESCRIPTION OF RELATED ART

In line with development of wireless power transfer technology, many electronic devices have recently used wireless power transfer technology for wireless charging or contactless charging. Wireless power transfer technology refers to a technology for converting electric energy into an electromagnetic wave having a frequency and wirelessly transferring energy to a load without a transfer line. According to the wireless power transfer technology, power may be wirelessly transferred from a power transmitting device to a power receiving device without wired connection between the power transmitting device and the power receiving device, thereby charging the battery of the power receiving device. The wireless power transfer technology may include a magnetic induction type, a magnetic resonance type, and various other types.

For example, a magnetic induction-type wireless power transfer system transfers power by using a magnetic field induced in a coil, and a magnetic field generated by a current flowing through a transmitting coil may be used such that an induction current flows through a receiving coil, thereby supplying energy to a load. Typical standards regarding the magnetic induction type include wireless power consortium (WPC), power matters alliance (PMA), and the like, and designated frequency bands may be used for power transfer, such as 110-205 kHz in the case of WPC, 227-357 kHz in the case of PMA, and 118~153 kHz.

The above information is presented as background information only to assist with an understanding of the disclosure. No determination has been made, and no assertion is made, as to whether any of the above might be applicable as prior art with regard to the disclosure.

SUMMARY

According to WPC, an electronic device may wirelessly transmit/receive power with an external electronic device by means of electric induction.

An electronic device (for example, wireless power transmitting device) in a standby mode (standby state or sleep mode) may sense an external electronic device (for example, wireless power receiving device) for wireless power transfer, and may start wireless power transfer upon sensing the external electronic device. The electronic device may control a designated current (for example, 8 mA) (for example, current for external electronic device or sensing current) to flow in a coil for the external electronic device in the standby mode.

The sensing current flowing through the coil in the standby mode may be an unnecessarily consumed current except when sensing an external electronic device. Therefore, sensing current flowing through the coil in the standby mode needs to maintain a magnitude determined such that current consumption is reduced, and an external electronic device can be sensed.

If an electronic device includes multiple coils, and if at least some of the multiple coils are used selectively through switch control, not only the sensing current flowing through the coil in the standby mode, but also a current (for example, 1 mA) used by the switch are required. As a result, a larger amount of current may be consumed by the electronic device in the standby mode than when no switch is used.

Aspects of the disclosure are to address at least the above-mentioned problems and/or disadvantages and to provide at least the advantages described below. Various embodiments of the disclosure may provide an electronic device capable of performing efficient wireless charging such that, in connection with a wireless power transmission/reception method, current consumption is reduced, and the performance of sensing an external electronic device is improved.

Various embodiments may provide an electronic device and a wireless power transmission/reception method in an electronic device, wherein the performance of sensing an external electronic device is improved while reducing the magnitude of sensing current flowing through a coil for an external electronic device sensing for wireless power transfer in a standby mode.

Various embodiments may provide an electronic device and a wireless power transmission/reception method in an electronic device, wherein, based on whether a second voltage lower than a first voltage for external electronic device sensing of a wireless power transmission/reception circuit flows through at least some of multiple coils while a switch for selecting at least some of the multiple coils remains deactivated in a standby mode, the switch is activated, and a sensing current for external electronic device sensing is provided.

Additional aspects will be set forth in part in the description which follows and, in part, will be apparent from the description, or may be learned by practice of the presented embodiments.

According to various embodiments, an electronic device may include a battery, a multi-coil circuit configured to include a first coil, a second coil, and a switch circuit connected between the first coil and the second coil, a wireless power transmission and reception circuit configured to be electrically connected to the multi-coil circuit, a power management module configured to be electrically connected to the battery and the wireless power transmission and reception circuit, and a processor configured to be electrically connected to the multi-coil circuit, the wireless power transmission and reception circuit, and the power management module, wherein the switch circuit is configured to receive a first control signal based on a voltage detected from the second coil, a second control signal by the processor, and a third control signal by the wireless power transmission and reception circuit, and perform a switch-ON operation or a switch-OFF operation based on at least some of the first control signal, the second control signal, and the third control signal.

According to various embodiments, a wireless power transmission and reception method in an electronic device may include controlling at least some circuits of a switch circuit of a multi-coil circuit including a first coil and a second coil to be turned on and a wireless power transmission and reception circuit to be disabled based on a ready mode, and monitoring a voltage of the second coil through the at least some circuits of the switch circuit, in the ready mode, switching from the ready mode to a wireless power reception mode or a first wireless power transmission mode based on the voltage of the second coil being equal to or greater than the designated threshold voltage, and controlling the switch circuit to be switched on and the wireless power transmission and reception circuit to be enabled based on the wireless power reception mode or the first wireless power transmission mode.

According to various embodiments, external electronic device sensing performance may be improved while reducing the magnitude of sensing current flowing through a coil for external electronic device sensing for wireless power transfer through a ready mode provided by an electronic device.

According to various embodiments, based on whether a second voltage lower than a first voltage for external electronic device sensing of a wireless power transmission/reception circuit flows through at least some of multiple coils while a switch for selecting at least some of the multiple coils remains deactivated in a standby mode, the switch may be activated, and a sensing current for external electronic device sensing may be provided, thereby reducing current consumption in the standby mode.

Advantageous effects obtainable from the present disclosure are not limited to the above-mentioned advantageous effects, and other advantageous effects not mentioned herein will be clearly understood by those skilled in the art to which the present disclosure pertains.

DESCRIPTION OF DRAWINGS

The above and other aspects, features, and advantages of certain embodiments of the disclosure will be more apparent from the following description taken in conjunction with the accompanying drawings, in which.

In connection with the description of the drawings, the same or similar reference numerals may be used for the same or similar components.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in this document are used only to describe specific embodiments, and may not be intended to limit the scope of other embodiments. The singular expression may include the plural expression unless the context clearly dictates otherwise. All terms used herein, including technical or scientific terms, may have the same meaning as commonly understood by one of ordinary skill in the art of the disclosure. Terms defined in general used in the dictionary may be interpreted as having the same or similar meaning as the meaning in the context of the related art, and unless explicitly defined in this document, are not interpreted in an ideal or excessively formal meaning. In some cases, even terms defined in this document cannot be construed to exclude embodiments of the disclosure.

Figure 1:
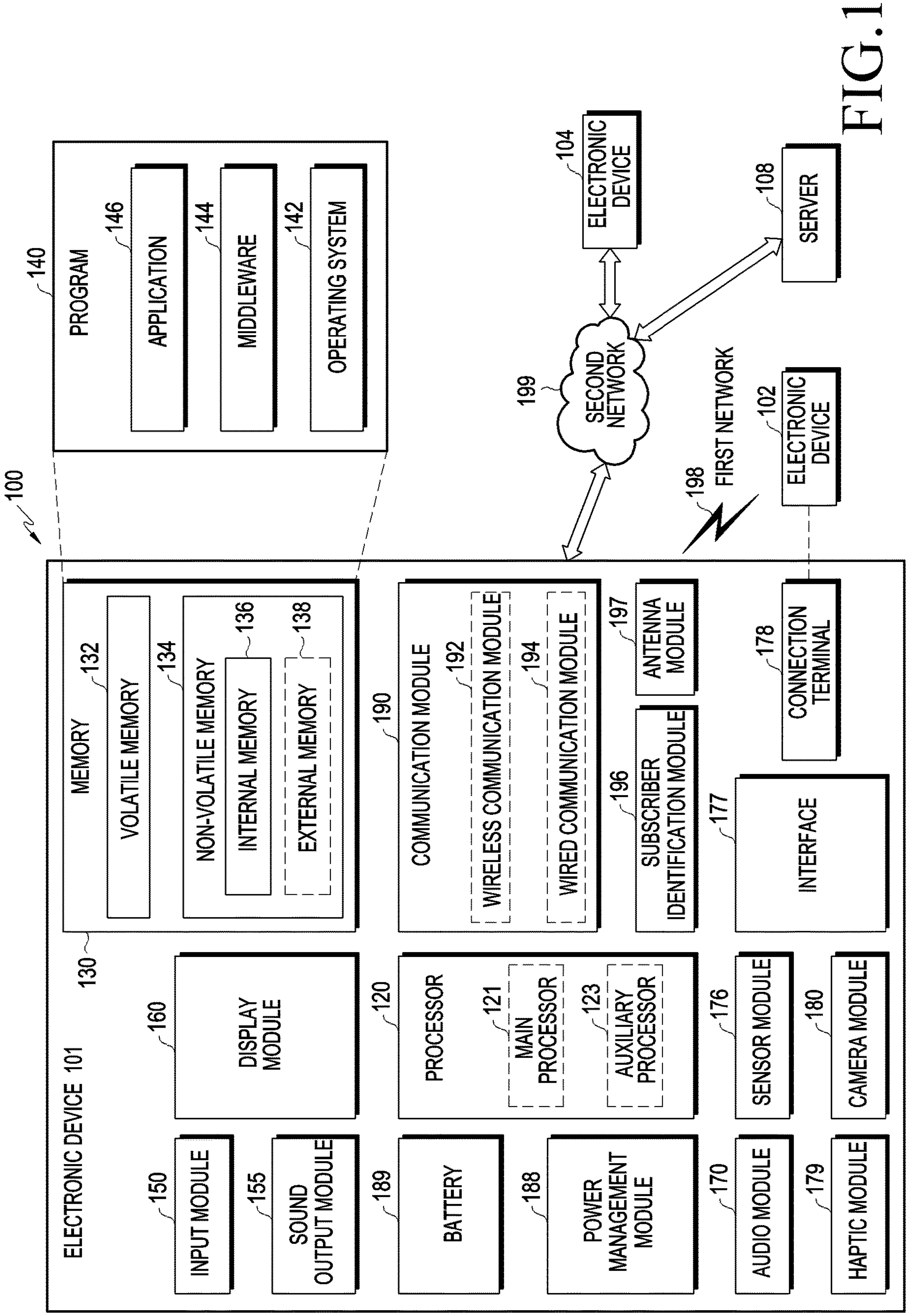
FIG. 1 is a block diagram illustrating an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
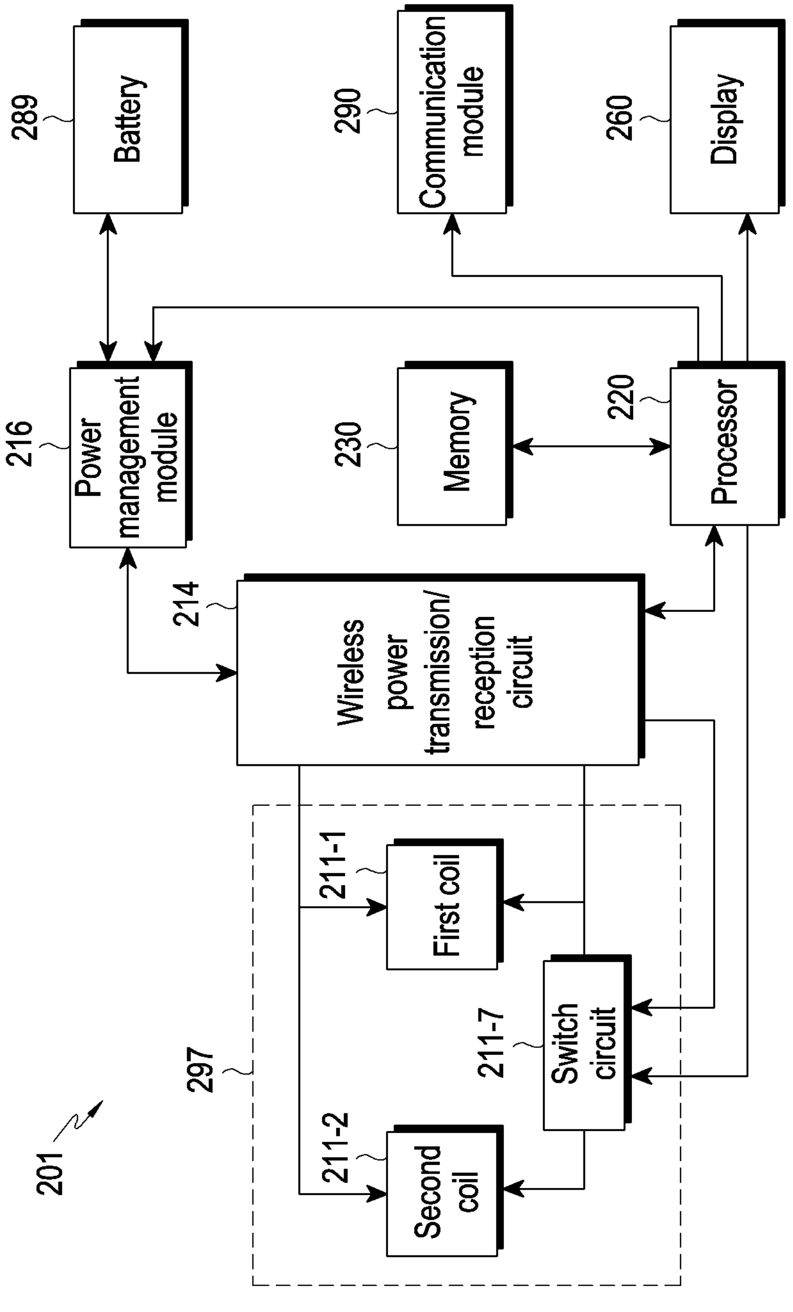
FIG. 2 is a block diagram illustrating an electronic device including a multi-coil circuit according to an embodiment.

FIG. 2 is a block diagram illustrating an electronic device including a multi-coil circuit according to an embodiment.

Referring to FIG. 2, an electronic device 201 (or a wireless power transmitter) (e.g., the electronic device 101 of FIG. 1) according to an embodiment may include some or all of a multi-coil circuit 297 (e.g., the antenna module 197 of FIG. 1), a wireless power transmission/reception circuit (wireless power transmit integrated circuit {WPT IC} (or magnetic field control IC) 214, a power management module (or PMIC (a power management integrated chip)) 216 (e.g., the power management module 188 of FIG. 1), a processor 220 (e.g., the processor 120 of FIG. 1), a memory 230 (e.g., the memory 130 of FIG. 1), a battery 289 (e.g., the battery 189 of FIG. 1), a communication module 290 (e.g., the communication module 190 of FIG. 1), and a display 260 (e.g., the display module 160 of FIG. 1).

The multi-coil circuit 297 according to an embodiment may include a first coil 211-1, a second coil 211-2, and a switch circuit 211-7 as a parallel double coil. The multi-coil circuit 297 may further include an additional coil in addition to the first coil 211-1 and the second coil 211-2. According to an embodiment, the multi-coil circuit 297 may be obtained by integrally packaging the first coil 211-1, the second coil 211-2, and the switch circuit 211-7. According to an embodiment, the first coil 211-1 and the second coil 211-2 may be coils for wireless power transmission/reception (e.g., near field magnetic induction {NFMI}). According to an embodiment, the first coil 211-1 may be included (or disposed) inside Coil_IN the multi-coil circuit 297, and the second coil may be included (or disposed) outside Coil_OUT the first coil 211-1. The length (or the number of turns) of each of the first coil 211-1 and the second coil 211-2 according to an embodiment may have a length (or the number of turns) used to wirelessly transmit power. According to an embodiment, the length (or the number of turns) of the first coil 211-1 may have a length (or the number of turns) used to wirelessly transmit first power using the first coil 211-1. According to an embodiment, the length (or the number of turns) of each of the first coil 211-1 and the second coil 211-2 may have a length (or the number of turns) used to wirelessly transmit second power using the first coil 211-1 and the second coil 211-2 connected in parallel in a state in which the first coil 211-1 and the second coil 211-2 are connected in parallel.

One end of the switch circuit 211-7 according to an embodiment may be connected to the first coil 211-1 and the wireless power transmission/reception circuit 214, and the other end thereof may be connected to the second coil 211-2. The switch circuit 211-7 according to an embodiment may include a switch element, may detect the voltage (or current) of the first coil 211-1 and/or the second coil 211-2, and may perform an ON or OFF operation of the switch element according to each of operation modes (e.g., a first mode, a second mode, and/or a third mode) associated with wireless power transmission/reception based on a first control signal (e.g., V_det trigger) by a voltage (or current) (e.g., V_det) detected in the first coil 211-1 and/or the second coil 211-2, a second control signal (e.g., WPT_EN) from the wireless power transmission/reception circuit 214, and/or a third control signal (e.g., Switch_EN) from the processor 220. For example, the switch element may allow the first coil 211-1 to be connected to the wireless power transmission/reception circuit 214 in a switched-off state, or may allow the first coil 211-1 and the second coil 211-2 connected in parallel in a switched-on state to be connected to the wireless power transmission/reception circuit 214.

Table 1 below is a table for describing operation modes related to wireless power transmission/reception of the electronic device 201.

TABLE 1

| Operation mode | Operation description | |
|---|---|---|
| First mode (ready mode) | Standby for wireless power transmissionand reception | |
| Second mode (wireless power reception mode or first wireless power transmission mode) | Wireless power reception | |
| | First wireless power transmission | Ping<br>P2P (Phone to Phone) |
| Third mode (second wireless power transmission mode or power saving mode) | Second wireless power transmission | P2A (Phone to Accessary) |
| | Prohibition of wireless power transmission | |

Referring to Table 1, operation modes related to wireless power transmission and reception of the electronic device 201 according to an embodiment may include some or all of first to third modes, and may further include other modes. The first mode according to an embodiment may be a ready mode. For example, the ready mode may be a standby state for wireless power transmission/reception, and in the ready mode, the electronic device may be in a sleep state while a battery voltage (or capacity) is equal to or greater than a threshold voltage (or a threshold capacity), or the electronic device may perform another operation not related to wireless power transmission/reception.

According to an embodiment, the second mode may be a wireless power reception mode or a first wireless power transmission mode. For example, the wireless power reception mode may be a mode for wirelessly receiving power from the outside (e.g., a first external electronic device or a second external electronic device). For example, the wireless power reception mode may be a mode for wirelessly receiving power from a first external electronic device or a second external electronic device using the first coil 211-1 and the second coil 211-2 connected in parallel in a state in which the first coil 211-1 and the second coil 211-2 are connected in parallel. For example, the first external electronic device may be an electronic device (e.g., a smartphone) that requires first power reception based on a first distance (or first center alignment accuracy) from the electronic device 102, and the second external electronic device may be an electronic device (e.g., an accessary device or smart watch capable of interworking with the electronic device 201) that requires reception of second power lower than the first power based on a second distance (e.g., second alignment accuracy obtained with a higher accuracy than the first alignment accuracy) closer than the first distance. For example, the first wireless power transmission mode may be a mode for wirelessly transmitting first power to a first external electronic device. For example, ping may indicate a state in which the electronic device 201 transmits a ping signal to transmit first power to the first external electronic device, and phone to phone (P2P) may indicate a state in which the electronic device 201 (e.g., a phone) transmits first power to the first external electronic device (e.g., a phone).

According to an embodiment, the third mode may be a second wireless power transmission mode or a power saving mode. For example, the second wireless power transmission mode may be a mode for wirelessly transmitting second power to the second external electronic device. For example, phone to accessary (P2A) may indicate a state in which the electronic device 201 (e.g., a phone) transmits second power to the second external electronic device (e.g., an accessary or watch). For example, the power saving mode may indicate a state in which a battery voltage (or capacity) is insufficient, a state in which wireless power transmission is impossible, or a state in which wireless power transmission is controlled not to be performed.

Table 2 below is a table showing a switch control signal and a switch on or off operation according to the operation mode.

TABLE 2

| | Switch control signal | | | Switch element |
|---|---|---|---|---|
| Operation mode | V_det | Switch_EN | WPT_EN | ON or OFF |
| First mode (ready mode) | V_det < Vth | H | L | ON (isolation) |
| Second mode (wireless power reception mode | V_det ≥ Vth | H | H | ON |
| or first wireless power transmission mode) | V_det ≥ Vth | H | H | ON |
| Third mode (second wireless power | V_det ≥ Vth | L | H | OFF |
| transmission mode or power saving mode) | — | L | L | OFF |

The Switch_EN according to an embodiment may be low when a battery voltage (or a battery capacity) is less than or equal to a designated threshold voltage (or a threshold capacity) or when the second wireless power transmission mode (P2A power sharing mode) is operated, may be high when the capacity of the battery 289 is equal to or greater than (or exceeds) a designated capacity and the first wireless power transmission mode (P2P) is operated, and may be applied from the processor 220 to the switch circuit 211-7.

The WPT_EN according to an embodiment may be high when the wireless power transmission/reception circuit 214 is enabled, may be low when the wireless power transmission/reception circuit 214 is not enabled, and may be applied from the wireless power transmission/reception circuit 214 to the switch circuit 211-7.

In the first mode and the second mode according to an embodiment, the switch element included in the switch circuit 211-7 may be controlled to be turned ON based on the signals V_det, Switch_EN, and WPT_EN so that operations in the first and second modes may be performed. According to an embodiment, in the first mode, since the wireless power transmission/reception circuit 214 is in a disabled state (WPT_EN=L) even if the switch element is in an ON state, the switch circuit 211-7 and the wireless power transmission/reception circuit 214 may enter into an isolated state, whereby the current consumption is small. For example, in the first mode, the switch circuit 211-7 may be controlled (or configured) so that a current may flow only in at least some circuits (or blocks or designated some circuits) (e.g., a voltage detector or at least some circuits associated with the voltage detector) necessary for transitioning to the second mode among all circuits in the switch circuit 211-7 even if the switch element is in the ON state.

Referring to Table 2, signals used for switch-ON or OFF control of the switch circuit 211-7 according to an embodiment may include a first control signal (e.g., V_det), a second control signal (e.g., Switch_EN), and a third control signal (e.g., WPT_EN). Although the signals V_det, Switch_EN, and WPT_EN have been described as three separate signals according to an embodiment, it will be apparent to those skilled in the art that at least some of the signals may be implemented as a combined signal.

The V_det according to an embodiment may be a signal indicating a voltage (or current) detected from the first coil 211-1 and/or the second coil 211-2. When the voltage (or current) detected by the first coil 211-1 and/or the second coil 211-2 is equal to or greater than a designated threshold voltage Vth, a V_det trigger signal may be generated. In the first mode, the wireless power transmission/reception circuit 214 may be enabled based on the generation of the V_det trigger signal, and the WPT_EN signal may be changed from L to H.

In the third mode according to an embodiment, a switch included in the switch circuit 211-7 may be controlled to be in an OFF state based on the signals V_det, Switch_EN, and WPT_EN, whereby the operation of the third mode may be performed while the first coil 211-1 and the second coil 211-2 are not connected.

The wireless power transmission/reception circuit 214 according to an embodiment may perform an operation of wirelessly receiving power or wirelessly transmitting power. The wireless power transmission/reception circuit 214 according to an embodiment may be connected to the first coil 211-1 based on the switch-ON or switch-OFF operation of the switch circuit 211-7, or may be connected to the first coil 211-1 and the second coil 211-2 connected in parallel. The wireless power transmission/reception circuit 214 according to an embodiment may perform a wireless power reception operation or a wireless power transmission operation through the first coil 211-1 and the second coil 211-2 connected in parallel. According to an embodiment, the wireless power transmission/reception circuit 214 may include a wireless power reception circuit (not shown) for wireless power reception and a wireless power transmission circuit (not shown) for wireless power transmission. For example, when wireless power is received, the wireless power reception circuit may perform power processing for rectifying the power of an AC waveform received through the first coil 211-1 or the first coil 211-1 and the second coil 211-2 connected in parallel into a DC waveform, converting the voltage, or regulating the power, and may transmit the obtained result to the power management module 216. For example, the wireless power transmission circuit may receive the power from the power management module 216 during wireless power transmission to generate an AC waveform for power transmission, and a magnetic field may be generated through the first coil 211-1 or the first coil 211-1 and the second coil 211-2 connected in parallel based on the generated AC waveform, whereby the wireless power may be transmitted through the magnetic field. The wireless power transmission/reception circuit 214 according to an embodiment may adjust an operating frequency or perform duty control based on a power control packet (e.g., a control error packet {CEP}) received from an external electronic device (e.g., the wireless power reception device) during the wireless power transmission. The wireless power transmission/reception circuit 214 according to an embodiment may transmit the operating frequency to the processor 220 at a designated time interval or regularly during the wireless power transmission. The wireless power transmission/reception circuit 214 according to an embodiment may transmit the WPT_EN signal to the switch circuit 211-7 in a method (e.g., a general-purpose input/output {GPIO} method) designated in the switch circuit 211-7 based on the control of the processor 220. For example, the wireless power transmission/reception circuit 214 may output a wireless power transmission/reception enabled signal WPT_EN as being low (L) in the power saving mode of the first mode and the third mode, and may output the wireless power transmission/reception enabled signal WPT_EN as being high (H) in the second wireless power transmission mode of the second mode and the third mode.

The power management module 216 according to an embodiment may be connected between the wireless power transmission/reception circuit 214 and the battery 289. The power management module 216 according to an embodiment may charge the battery 289 using the power received using the multi-coil circuit 297 and the wireless power transmission/reception circuit 214, and may output the power from the battery 289 to the outside through the wireless power transmission/reception circuit 214 and the multi-coil circuit 297. For example, the wireless power transmission/reception circuit 214 may use the power provided through the power management module 216 to generate a magnetic field in the first coil of the multi-coil circuit 297 or the first coil 211-1 and the second coil 211-2 connected in parallel, so that the power may be wirelessly transmitted to an external electronic device. For example, the power from the battery 289 may be wirelessly shared with an external electronic device. According to various embodiments, the external electronic device may be one of various types of external electronic devices. For example, the various types of external electronic devices may include an accessory device (e.g., a smart watch, a wireless headset, or a wireless earphone) capable of interworking with the electronic device 201 (e.g., a smartphone).

According to an embodiment, the processor 220 may perform an overall control operation of the electronic device 201. The processor 220 according to an embodiment may perform a control operation on at least some or all of a plurality of modes (e.g., some or all of the first to third modes) associated with wireless power transmission/reception. For example, the processor 220 may identify the first mode (ready mode), the second mode (the wireless power reception mode or the first wireless power transmission mode), and/or the third mode (the second wireless power transmission mode or the power saving mode) of the electronic device 201 or may identify or control the state transition of each mode, and may provide the second control signal (or the switch control signal {Switch_EN}) according to each mode to the switch circuit 211-7. For example, the processor 220 may output the second control signal Switch_EN as being high (H) in the first and second modes, and may output the second control signal Switch_EN as being low (L) in the third mode.

According to an embodiment, the processor 220 may control the wireless power transmission/reception circuit 214 and the multi-coil circuit 297 to operate in the first mode (ready mode) in the standby state (or the standby mode) of the electronic device 201. For example, the processor 220 may provide the second control signal (or the switch control signal {Switch_EN}) as being H to the switch circuit 211-7 of the multi-coil circuit 297 in the first mode, and may control the wireless power transmission/reception circuit 214 to provide the third control signal (or the power transmission/reception enabled signal {WPT_EN}) as being low (L) to the switch circuit 211-7. The processor 220 according to an embodiment may control the switch circuit 211-7 or at least some circuits (e.g., the voltage detector in the switch circuit 211-7 or some circuits associated with the voltage detector) of the switch circuit 211-7 to monitor the voltage of the first coil 211-1 and/or the second coil 211-2 in a state in which a signal Switch_EN=H & WPT_EN=L is provided to the switch circuit 211-7. For example, the switch circuit 211-7 may monitor the voltage of the first coil 211-1 and/or the second coil 211-2 in a state in which the signal Switch_EN=H & WPT_EN=L is applied, and the first control signal (e.g., V_det trigger) may be generated when the voltage of the first coil 211-1 and/or the second coil 211-2 is equal to or greater than a threshold voltage Vth.

According to an embodiment, the processor 220 may identify (or determine) whether the signal V_det trigger is generated by the switch circuit 211-7 in the first mode. Alternatively, the processor 220 may separately identify whether the voltage of the first coil 211-1 and/or the second coil 211-2 is equal to or greater than the threshold voltage Vth. According to an embodiment, the processor 220 may control the wireless power transmission/reception circuit 214 to perform a ping phase operation for a designated time period (tmin) (e.g., several ms) as the signal V_det trigger is generated. For example, the designated time period may be a time for normally receiving a first packet (e.g., a signal strength packet {SSP}) from the external electronic device after the ping signal is applied. According to an embodiment, the processor 220 may detect the external electronic device through the reception of the SSP. According to an embodiment, the processor 220 may determine whether the wireless power transmission/reception circuit 214 detects (senses or identifies) the external electronic device after the ping operation for the designated time period (e.g., whether the SSP is received). According to an embodiment, when the external electronic device is detected (sensed or identified), the processor 220 may control the wireless power transmission/reception circuit 214 to provide a signal WPT_EN=H to the switch circuit 211-7, and may operate in any one of the second wireless power transmission mode of the second mode or the third mode. For example, in the processor 220, when the external electronic device is detected (sensed or identified), the wireless power transmission/reception circuit 214 may provide the signal WPT_EN=H to the switch circuit 211-7, may perform an authentication operation on the external electronic device to identify the external electronic device, and may receive information necessary for transmitting/receiving power to/from the external electronic device. For example, the information necessary for identifying the external electronic device may include an ID of the external electronic device and/or information about required or available power of the external electronic device. The processor 220 according to an embodiment may operate in any one of the second wireless power transmission modes of the second mode and the third mode through the authentication operation. According to an embodiment, when the external electronic device is not detected (sensed or identified), the processor 220 may control the wireless power transmission/reception circuit 214 to continue to provide the signal WPT_EN=L to the switch circuit 211-7 and may keep the first mode.

The memory 230 (e.g., the memory 130 of FIG. 1) according to an embodiment may store a variety of control data or data tables (e.g., Table 1 and/or Table 2) used by at least one component (e.g., the processor 220 or the wireless power transmission/reception circuit 214) of the electronic device 201. According to an embodiment, the memory 230 may store instructions for performing the operation of the processor 220 of the electronic device 201. According to various embodiments, the memory 230 may be implemented in various forms, such as read only memory (ROM), random access memory (RAM), or flash memory, and the implementation form may not be limited.

The communication module 290 according to an embodiment may communicate with the external electronic device and/or other external electronic devices or servers, and may obtain ID information of the external electronic device or required or available power of the external electronic device through the communication.

The display 260 according to an embodiment may display data or a screen required for wireless power transmission/reception operations. For example, the display 260 may display a screen displaying at least a portion of information corresponding to modes (e.g., first to third modes) related to wireless power transmission.

The electronic device 201 according to an embodiment may further include an input module (e.g., a touch input module, a key input module, or a user interface module), and may receive an input related to wireless power transmission and reception from the user or the external device through the input module.

According to various embodiments, an electronic device (e.g., the electronic device 101 of FIG. 1 or the electronic device 201 of FIG. 2) may include a battery, a multi-coil circuit configured to include a first coil, a second coil, and a switch circuit connected between the first coil and the second coil, a wireless power transmission/reception circuit configured to be electrically connected to the multi-coil circuit, a power management module configured to be electrically connected to the battery and the wireless power transmission/reception circuit, and a processor configured to be electrically connected to the multi-coil circuit, the wireless power transmission/reception circuit, and the power management module, wherein the switch circuit may be configured to receive a first control signal based on a voltage detected from the second coil, a second control signal by the processor, and a third control signal by the wireless power transmission/reception circuit, and to perform a switch-ON operation or a switch-OFF operation based on at least some of the first control signal, the second control signal, and the third control signal.

According to various embodiments, the switch circuit may include a switch element configured to be connected between the first coil and the second coil to connect or disconnect the first coil and the second coil in parallel, and a voltage detector configured to be connected between the second coil and the switch element, to detect a voltage of the second coil, and to provide the first control signal to the switch element when the voltage of the second coil is equal to or greater than a designated threshold voltage.

According to various embodiments, the second control signal and the third control signal may be respectively controlled to be high or low based on a ready mode, a power reception mode, a first power transmission mode, a second power transmission mode, or a power saving mode of the electronic device.

According to various embodiments, in the ready mode, the processor may be configured to control the second control signal to be high, and the third control signal to be low.

According to various embodiments, in the ready mode, the switch circuit may be configured to detect the voltage of the second coil through the voltage detector of the switch circuit based on the second control signal being high and the third control signal being low.

According to various embodiments, the processor may be configured to switch the ready mode to the wireless power reception mode or the first power transmission mode when the voltage of the second coil detected by the voltage detector is equal to or greater than the designated threshold voltage.

According to various embodiments, in the power reception mode or the first power transmission mode, the processor may be configured to control the second control signal to be high and the third control signal to be high.

According to various embodiments, in the wireless power reception mode or the first wireless power transmission mode, based on the second control signal being high and the third control signal being high, the switch circuit may be configured to connect the first coil and the second coil in parallel and the wireless power transmission/reception circuit may be configured to wirelessly receive power from an external electronic device through the parallel-connected first coil and second coil or to wirelessly transmit first power to a first external electronic device.

According to various embodiments, in the second wireless power transmission mode, based on the second control signal being high and the third control signal being high, the switch circuit may be configured to disconnect the first coil and the second coil connected in parallel and the wireless power transmission/reception circuit may be configured to wirelessly transmit second power to a second external electronic device through the first coil.

According to various embodiments, in the power saving mode, based on the second control signal being low and the third control signal being low, the switch circuit may be configured to disconnect the first coil and the second coil connected in parallel and the wireless power transmission/reception circuit may be configured to be in a disabled state.

Figure 3:
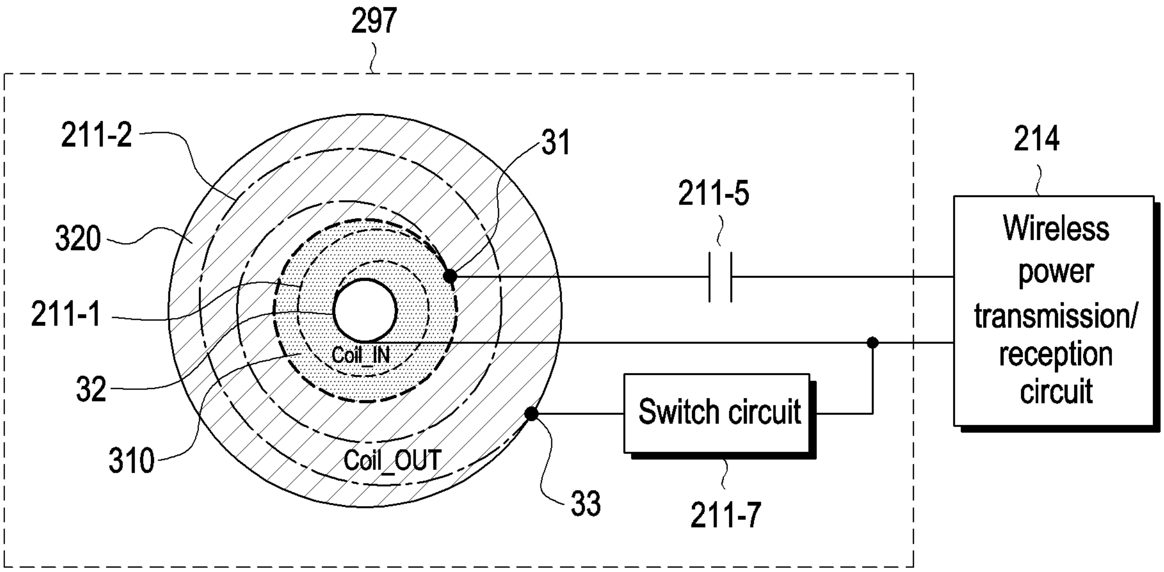
FIG. 3 is a diagram illustrating a first coil and a second coil of a multi-coil circuit according to an embodiment.

FIG. 3 is a diagram illustrating a first coil and a second coil of a multi-coil circuit according to an embodiment.

Referring to FIG. 3, in the multi-coil circuit 297 according to an embodiment, a first coil (e.g., the first coil 211-1 of FIG. 2) may be disposed in a Coil_IN area 310, and a second coil (e.g., the second coil 211-2 of FIG. 2) may be disposed in a Coil_OUT area 320. For example, the first coil 211-1 may be a circular coil, and the second coil 211-2 may be a coil surrounding the outside of the first coil 211-1. The Coil_IN area 310 and the Coil_OUT area 320 of the multi-coil circuit 297 may overlap each other. The multi-coil circuit 297 according to an embodiment may be branched into the first coil 211-1 and the second coil 211-2 at a first point 31 that is a boundary point (e.g., an outer diameter of the first coil 211-1 or an inner diameter of the second coil 211-2) between the Coil_IN area 310 and the Coil_OUT area 320.

According to an embodiment, the first coil 211-1 may be wound to have a designated number of turns from the first point 31 to a second point 32 (e.g., the innermost point of the Coil_IN area 310) inside the Coil_IN area 310, and the second point 32 may be connected to the wireless power transmission/reception circuit 214. According to an embodiment, the second coil 211-2 may be wound to have a designated number of turns from the first point 21 to a third point 33 (e.g., the outermost point of the Coil_OUT area 320) outside the Coil_OUT area 320, and the third point 33 may be connected to the switch circuit 211-7.

According to an embodiment, at least one capacitor (Cs cap or Cd cap) 211-5 may be included between the wireless power transmission/reception circuit 214 and the first point 31.

Figure 4:
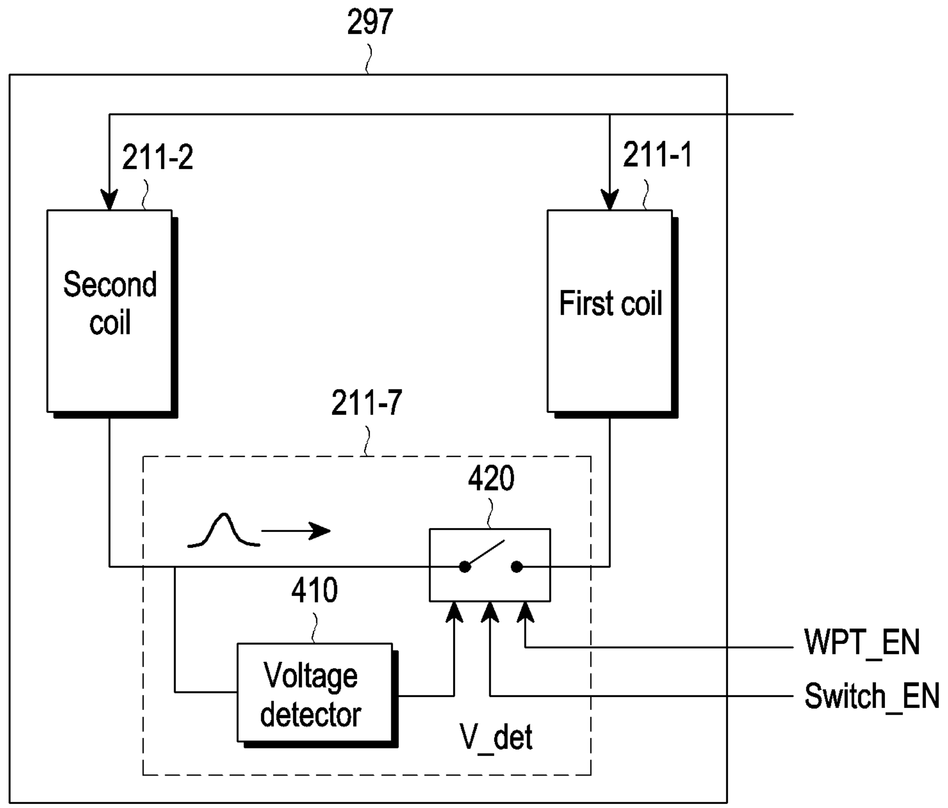
FIG. 4 is a diagram illustrating a switch circuit according to an embodiment.

FIG. 4 is a diagram illustrating a switch circuit according to an embodiment.

Referring to FIG. 4, the switch circuit 211-7 according to an embodiment may include a voltage detector (or a voltage comparator) 410 and a switch element 420. The voltage detector 410 according to an embodiment may be connected between the second coil 211-2 and the switch element 420, may detect (or sense) a voltage (or a current) flowing in the second coil 211-2 in a first mode (e.g., the ready mode), and may output a detection result signal V_det (e.g., a V_det trigger signal). The voltage detector 410 according to an embodiment may compare the voltage detected in the second coil 211-2 with a designated threshold voltage Vth in the first mode (e.g., the ready mode) to output the V_det trigger signal when the voltage detected in the second coil 211-2 exceeds the threshold voltage Vth.

The switch element 420 according to an embodiment may receive (may be authorized by) the signal V_det from the voltage detector 410, and may be activated by receiving power based on a control signal from a processor (e.g., the processor 220 of FIG. 2). For example, a second control signal for activating the switch element 420 may be a signal Switch_EN. The switch element 420 according to an embodiment may receive (may be authenticated by) a signal WPT_EN from a wireless power transmission/reception circuit (e.g., the wireless power transmission/reception circuit 214 of FIG. 2). The switch element 420 according to an embodiment may perform a switch ON/OFF operation based on the signals V_det, Switch_EN, and/or WPT_EN according to each of the operation modes associated with wireless power transmission/reception. For example, the switch element 420 may perform the switch ON/OFF operation according to the examples shown in Table 2.

Figure 5:
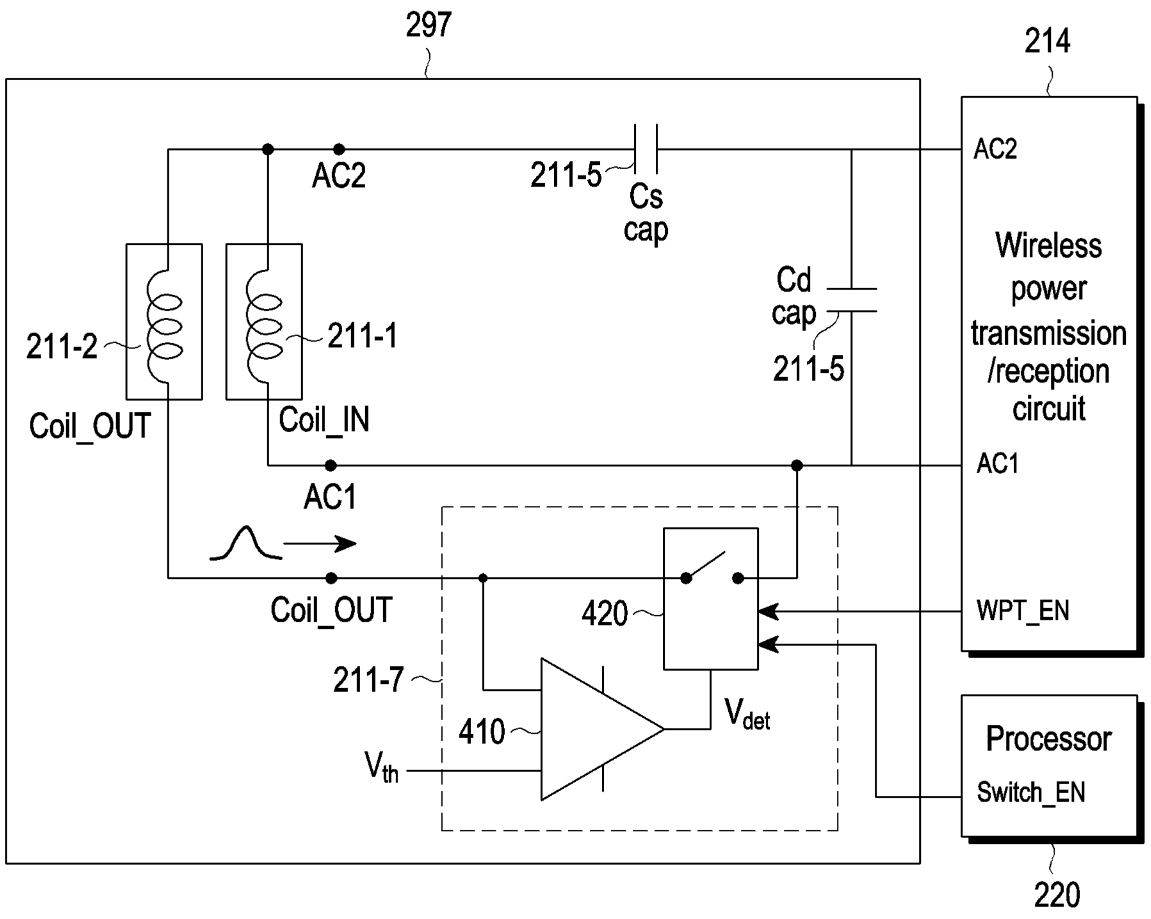
FIG. 5 is a block diagram illustrating a multi-coil circuit according to an embodiment.

FIG. 5 is a block diagram illustrating a multi-coil circuit according to an embodiment.

Referring to FIG. 5, according to an embodiment, the multi-coil circuit 297 may include the first coil 211-1, the second coil 211-2, at least one capacitor 211-5, and a switch circuit 211-7. According to an embodiment, the first coil 211-1 and the second coil 211-2 may be coils for wireless power transmission/reception (e.g., NFMI).

According to an embodiment, the first coil 211-1 may be an inner coil Coil_IN, and the second coil 211-2 may be disposed as an outer coil Coil_OUT of the first coil 211-1.

According to an embodiment, both ends AC1 and AC2 of the first coil 211-1 may be connected to the wireless power transmission/reception circuit 214, and one end AC2 of both ends AC1 and AC2 of the first coil 211-1 may be connected to the second coil 211-2.

According to an embodiment, one end of the second coil 211-2 may be connected to the first coil 211-1, and the other end thereof may be connected to the switch circuit 211-7.

According to an embodiment, at least one capacitor Cs cap or Cd cap 211-5 may wirelessly receive power through the first coil 211-1 or the first coil 211-1 and the second coil 211-2 connected in parallel or may wirelessly transmit first power to a first external electronic device through the first coil 211-1 and the second coil 211-2 connected in parallel, or the multi-coil circuit 297 may have a capacitance value required to maintain a designated inductance and resistance when second power is wirelessly transmitted to a second external electronic device through the first coil 211-1.

According to an embodiment, one end of the switch circuit 211-7 may be connected to the second coil 211-2, and the other end thereof may be connected to the wireless power transmission/reception circuit 214. The switch circuit 211-7 according to an embodiment may include the voltage detector (or the voltage comparator) 410 and the switch element 420. The voltage detector 410 according to an embodiment may be connected between the second coil 211-2 and the switch element 420.

According to an embodiment, the processor 220 may switch on (Switch_EN=H) the switch element 420 of the switch circuit 211-7 in the first mode (e.g., the ready mode), and may control the wireless power transmission/reception circuit 214 to output a wireless power transmission/reception enabled signal as a low signal (WPT_EN=L). For example, the processor 220 may control (or control to be insulated from the wireless power transmission/reception circuit 214) a current to flow only in at least some circuits (or blocks) (e.g., circuits associated with the voltage detector 410) necessary for transitioning from the first mode to the second mode among all circuits in the switch circuit 211-7.

In the first mode according to an embodiment, the voltage detector 410 of the switch circuit 211-7 may detect (or sense) the voltage (or current) flowing in the second coil 211-2, and may output a detection result signal V_det (e.g., V_det trigger signal). In a state in which the switch element 420 is switched on and the current is controlled to flow only in at least some circuits (or blocks) (e.g., circuits associated with the voltage detector 410) necessary for transitioning to the second mode among all circuits in the switch circuit 211-7, the voltage detector 410 according to an embodiment may compare the voltage detected in the second coil 211-2 with a designated threshold voltage Vth to output the V_det trigger signal when the voltage detected in the second coil 211-2 exceeds the threshold voltage Vth.

According to an embodiment, as the V_det trigger signal is generated, the processor 220 may control (or release the insulation between the switch circuit 211-7 and the wireless power transmission/reception circuit 214) the wireless power transmission/reception circuit 214 to provide the signal WPT_EN=H to the switch circuit 211-7, thereby controlling a current to flow in all circuits in the switch circuit 211-7 while the switch element 420 is switched on. Accordingly, the signals V_det≥Vth, Switch_EN=H, and WPT_EN=H may be applied to the switch circuit 211-7 so that the first coil 211-1 and the second coil 211-2 connected in parallel may be connected to the wireless power transmission/reception circuit 214 through the switch circuit 211-7 and a ping phase operation may be started. The processor 220 may perform an authentication operation based on detection of an external electronic device by the ping phase operation to identify the external electronic device and to receive information necessary for transmitting/receiving power to/from the external electronic device. For example, the information for identifying the external electronic device may include an ID of the external electronic device and/or information about required power or available power of the external electronic device. The processor 220 according to an embodiment may identify any one of the second wireless power transmission modes of the second to third modes through the authentication operation, and the signals Switch_EN and WPT_EN according to each mode may be controlled to be applied to the switch circuit 211-7 to correspond to any one mode of the second wireless power transmission modes of the second mode and the third mode.

Figure 6:
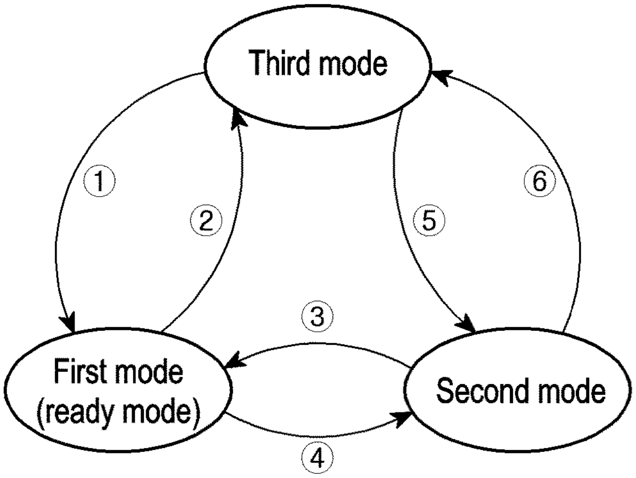
FIG. 6 is a diagram illustrating a state transition between first to third modes in an electronic device according to an embodiment.

FIG. 6 is a diagram illustrating a state transition between first to third modes in an electronic device according to an embodiment.

Referring to FIG. 6, the processor 220 of the electronic device 201 according to an embodiment may perform a transition (e.g., a mode change) between modes associated with wireless power transmission and reception.

The modes related to wireless power transmission and reception according to an embodiment may include a first mode (e.g., a ready mode), a second mode (e.g., a wireless power reception mode or a first wireless power transmission mode), and a third mode (e.g., a second wireless power transmission mode or a power saving mode).

In the processor 220 according to an embodiment, in the first mode (ready mode), a signal Switch_EN may be in a state of H and a signal WPT_EN may be in a state of L (Switch_EN:H && WPT_EN:L). The processor 220 according to an embodiment may be switched from the first mode (the ready mode) to the second mode as V_det trigger is generated (or detected) □. The processor 220 according to an embodiment may control the signal Switch_EN as being L (Switch_EN: L) in the first mode (ready mode), and may be switched to the third mode. According to an embodiment, when WPT_EN:L becomes WPT_EN:H before the V_det trigger is generated in the first mode (the ready mode), the processor 220 may be switched from the first mode to the second mode.

The processor 220 according to an embodiment may be switched to the first mode as the signal WPT_EN becomes L (WPT_EN: L) in the second mode □. The processor 220 according to an embodiment may be switched from the second mode to the third mode as the signal Switch_EN becomes L (Switch_EN: L) □.

The processor 220 according to an embodiment may be switched from the third mode to the first mode as the signal Switch_EN becomes H and the signal WPT_EN becomes L (Switch_EN:H && WPT_EN:L) □. The processor 220 according to an embodiment may be switched from the third mode to the second mode as the signal Switch_EN becomes H or the signal WPT_EN becomes H (Switch_EN:H WPT_EN:H) □.

According to various embodiments, a wireless power transmission and reception method in an electronic device (e.g., the electronic device 101 of FIG. 1 or the electronic device 201 of FIG. 2) may include controlling at least some circuits of a switch circuit of a multi-coil circuit including a first coil and a second coil to be turned on and a wireless power transmission and reception circuit to be disabled based on a ready mode and monitoring a voltage of the second coil through the at least some circuits of the switch circuit, in the ready mode, switching from the ready mode to a wireless power reception mode or a first wireless power transmission mode based on the voltage of the second coil is equal to or greater than the designated threshold voltage, and controlling the switch circuit to be switched on and the wireless power transmission/reception circuit to be enabled based on the wireless power reception mode or the first wireless power transmission mode.

According to various embodiments, the method may further include receiving wireless power from an external electronic device while operating in the wireless power reception mode, or wirelessly transmitting first power to a first external electronic device while operating in the first wireless power transmission mode.

According to various embodiments, the method may further include switching from the ready mode, the wireless power reception mode or the first wireless power transmission mode to a second wireless power transmission mode or a power saving mode, and controlling the switch circuit to be switched to a switch OFF state based on the second wireless power transmission mode or the power saving mode.

According to various embodiments, the switch circuit may include a switch element configured to be connected between the first coil and the second coil to connect the first coil and the second coil in parallel or disconnect the first coil and the second coil connected in parallel, and a voltage detector configured to be connected between the second coil and the switch element, to detect a voltage of the second coil, and to provide the first control signal to the switch element when the voltage of the second coil is equal to or greater than a designated threshold voltage.

According to various embodiments, the method may include, in the ready mode, monitoring the voltage of the second coil using the voltage detector.

According to various embodiments, the method may include providing a second control signal and a third control signal to the switch circuit and controlling the second control signal and the third control signal are respectively to be high or low based on the ready mode, the wireless power reception mode, the first wireless power transmission mode, the second wireless power transmission mode, or the power saving mode of the electronic device.

According to various embodiments, the method may include controlling the second control signal to be high and the third control signal to be low based on the ready mode, and controlling the voltage of the second coil to be detected through the voltage detector of the switch circuit based on the second control signal being high and the third control signal being low.

According to various embodiments, the method include controlling the second control signal to be high and the third control signal to be high in the wireless power reception mode or the first wireless power transmission mode, controlling the first coil and the second coil to be connected in parallel through the switch circuit in the wireless power reception mode or the first wireless power transmission mode and the wireless power transmission/reception circuit to receive power from an external electronic device or to transmit first power to a first external electronic device through the first coil and the second coil connected in parallel based on the second control signal being high and the third control signal being high.

According to various embodiments, the method may include controlling the second control signal to be low and the third control signal to be high in the second wireless power transmission mode, and controlling the parallel connection of the first coil and the second coil to be released and the wireless power transmission/reception circuit to wirelessly transmit second power to a second external electronic device through the first coil based on the second control signal being low and the third control signal to be high.

According to various embodiments, the method may include controlling the second control signal to be low and the third control signal to be low in the power saving mode, controlling the parallel connection of the first coil and the second coil to be released and the wireless power transmission/reception circuit to be disabled based on the second control signal being low and the third control signal being low.

Figure 7:
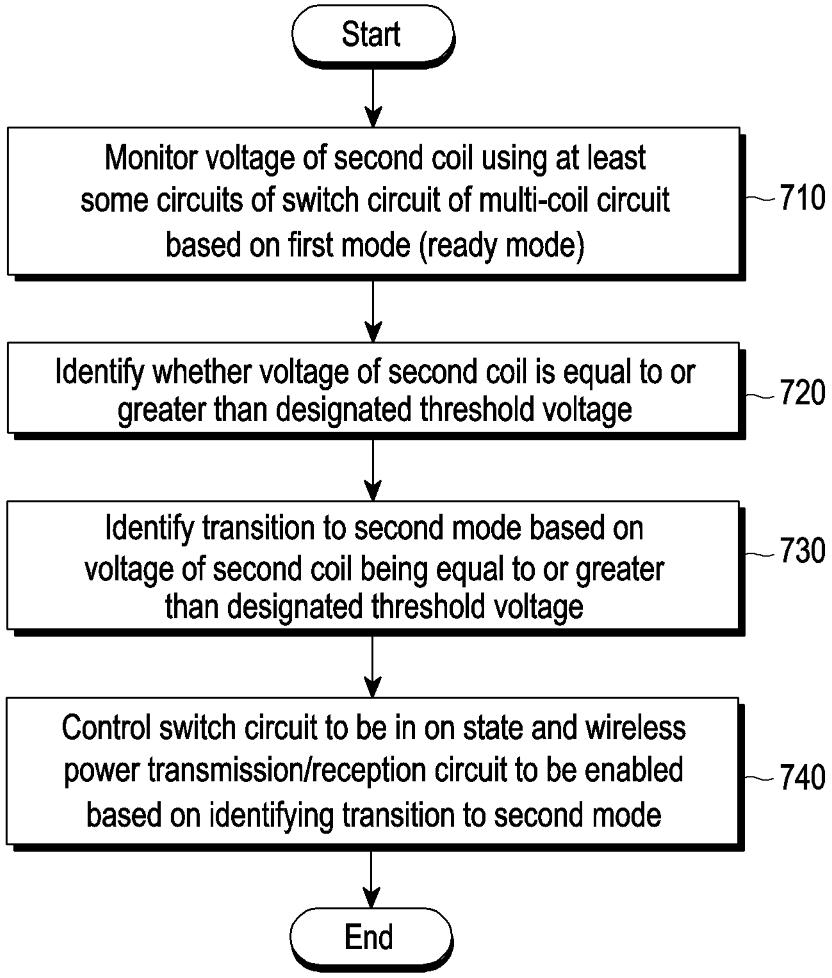
FIG. 7 is a flowchart illustrating a mode switching operation associated with multi-coil-based wireless power transmission/reception in an electronic device according to an embodiment.

FIG. 7 is a flowchart illustrating a mode switching operation associated with multi-coil-based wireless power transmission/reception in an electronic device according to an embodiment.

Referring to FIG. 7, a processor (e.g., the processor 120 of FIG. 1 and the processor 220 of FIG. 2) of an electronic device (e.g., the electronic device 101 of FIG. 1 or the electronic device 201 of FIG. 2) according to an embodiment may perform at least one operation of operations 710 to 740.

In operation 710, the processor 220 according to an embodiment may control at least some circuits (e.g., circuits associated with the voltage detector 410) of the switch circuit 211-7 of the multi-coil circuit 297 to be turned on and the wireless power transmission/reception circuit 214 to be disabled based on a first mode (a ready mode), and may monitor a voltage of the second coil 211-2 through the at least some circuits of the switch circuit 211-7. For example, the processor 220 may identify the first mode (e.g., the ready mode) based on a standby state, may turn on at least some circuits of the switch element 420 (Switch_EN=H) based on the first mode, may control the wireless power transmission/reception circuit 214 to output a wireless power transmission/reception enabled signal as a low signal (WPT_EN=L), and may control the voltage detector 410 to detect a voltage flowing in the second coil 211-2. For example, the processor 220 may control the voltage detector 410 to detect the voltage flowing in the second coil 211-2 while a current is controlled (or control to be insulated from the wireless power transmission/reception circuit 214) to flow only in at least some circuits (or blocks) (e.g., circuits associated with the voltage detector 410) necessary for transitioning from the first mode to the second mode and the third mode among all circuits in the switch circuit 211-7.

In operation 720, the processor 220 according to an embodiment may identify whether the voltage of the second coil 211-2 is equal to or greater than a designated threshold voltage. For example, the processor 220 may receive a V_det trigger signal based on the result obtained by detecting (sensing) the voltage (or current) flowing in the second coil 211-2 detected from the voltage detector 410, and may identify whether the voltage of the second coil 211-2 is equal to or greater than the threshold voltage when the V_det trigger signal is received.

In operation 730, the processor 220 according to an embodiment may identify a transition to the second mode based on the fact that the voltage of the second coil is equal to or greater than the designated threshold voltage. For example, the processor 220 may identify the transition to the second mode based on the reception of the V_det trigger signal.

In operation 740, the processor 220 according to an embodiment may control the switch circuit 211-7 to be in a switched-on state based on the identifying the transition to the second mode, and may control the wireless power transmission/reception circuit 214 to be enabled. For example, the processor 220 may maintain (Switch_EN=H) ON of the switch element 420 based on the identifying the transition to the second mode, may control the current to be supplied to all circuits in the switch circuit 211-7, and may control the wireless power transmission/reception circuit 214 to output a wireless power transmission/reception enabled signal as a high signal (WPT_EN=H). The processor 220 according to an embodiment may operate in a wireless power reception mode in the second mode to receive wireless power from an external electronic device or may operate in a first wireless power transmission mode to transmit first power to a first external electronic device.

Figure 8:
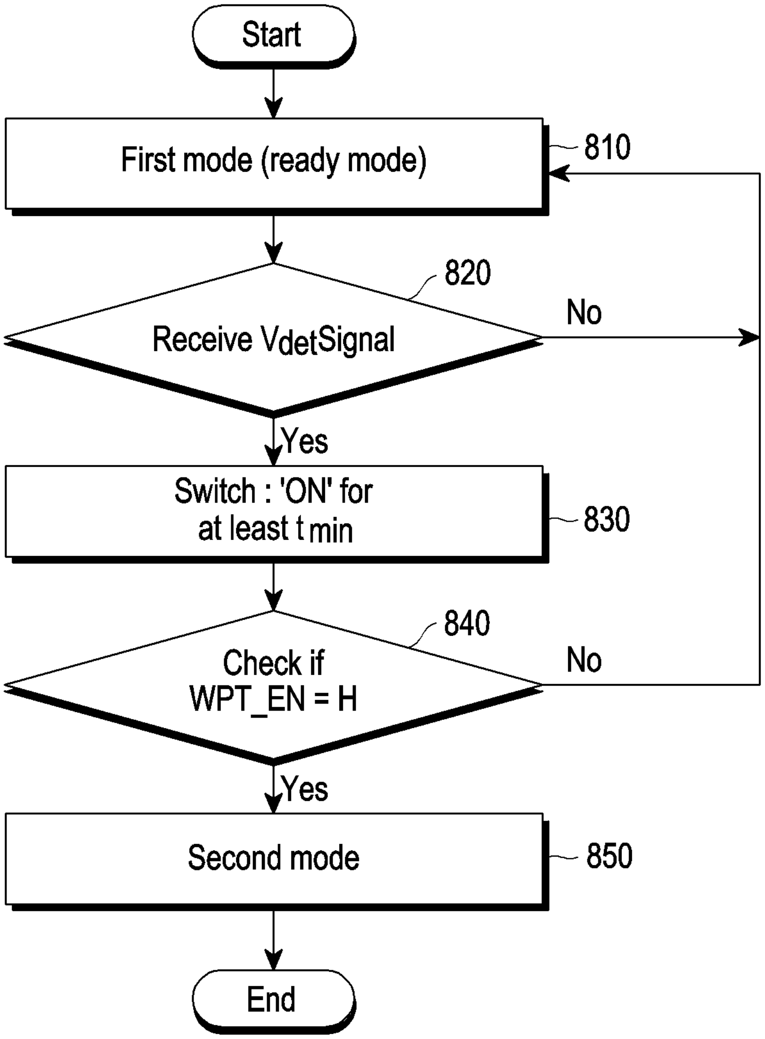
FIG. 8 is a flowchart illustrating a state transition operation from a first mode to a second mode in an electronic device according to an embodiment.

FIG. 8 is a flowchart illustrating a state transition operation from a first mode to a second mode in an electronic device according to an embodiment.

Referring to FIG. 8, a processor (e.g., the processor 120 of FIG. 1 and the processor 220 of FIG. 2) of an electronic device (e.g., the electronic device 101 of FIG. 1 or the electronic device 201 of FIG. 2) according to an embodiment may perform at least one of operations 810 to 850.

In operation 810, the processor 220 according to an embodiment may control the wireless power transmission/reception circuit 214 and the multi-coil circuit 297 to operate in a first mode (a ready mode) in a standby state (or a standby mode) (Ready mode). For example, the processor 220 may provide a second control signal (a switch control signal {Switch_EN}) as being H to the switch circuit 211-7 of the multi-coil circuit 297 in the first mode, may control the wireless power transmission/reception circuit 214 to provide a third control signal (a power transmission/reception enabled signal {WPT_EN}) as being L to the switch circuit 211-7, and may control the voltage detector 410 to detect (or monitor) a voltage flowing in the second coil 211-2. The processor 220 according to an embodiment may control (or control to be insulated from the wireless power transmission/reception circuit 214) a current to flow only in at least some circuits (or blocks necessary for transitioning to a second wireless power transmission mode of the second mode or the third mode among all circuits in the switch circuit 211-7 in a state in which a signal Switch_EN=H && WPT_EN=L is provided to the switch circuit 211-7 in the ready mode. For example, the voltage detector 410 of the switch circuit 211-7 may monitor the voltage of the first coil 211-1 and/or the second coil 211-2 in the ready mode, and when the voltage of the first coil 211-1 and/or the second coil 211-2 is equal to or greater than the threshold voltage Vth, a first control signal (e.g., V_det trigger) may be generated.

In operation 820, the processor 220 according to an embodiment may identify (or determine) whether the V_det signal is received (generated) in the first mode (Receive V_det signal?). For example, the processor 220 may identify whether a V_det trigger is generated as the V_det signal. For example, the V_det trigger signal in the voltage detector 410 may be a signal generated when the voltage of the second coil 211-2 exceeds the threshold voltage Vth. When the V_det trigger signal is not received (or identified), the processor 220 according to an embodiment may return to operation 810 to maintain the first mode.

In operation 830, the processor 220 according to an embodiment may control (or release the insulation with the wireless power transmission/reception circuit 214) the wireless power transmission/reception circuit 214 to flow a current in all circuits (or all blocks) in the switch circuit 211-7 while maintaining (e.g., maintaining the switch element 420 to be in a switched-on state) a second control signal (a switch control signal {Switch_EN}) as being H for a designated time period tmin (e.g., several ms) based on the fact that the V_det trigger signal is identified, and may control the wireless power transmission/reception circuit 214 to perform a ping phase (Switch "ON" for at least tmin) For example, the designated time period tmin may be a time for normally receiving a first packet (e.g., a signal strength packet {SSP}) from the external electronic device after the ping signal is applied. According to an embodiment, the processor 220 may detect an external electronic device through SSP reception. According to an embodiment, the processor 220 may identify (or determine) whether the wireless power transmission/reception circuit 214 has detected (sensed or identified) an external electronic device during a ping phase operation of a designated time period (e.g., whether the SSP has been received).

In operation 840, the processor 220 according to an embodiment may identify (or determine) whether a third control signal of the wireless power transmission/reception circuit 214 is WPT_EN=H according to whether the external electronic device has been detected (sensed or identified). For example, the processor 220 may identify (or determine) whether the wireless power transmission/reception circuit 214 should provide a WPT_EN=H signal to the switch circuit 211-7 (check if WPT_EN=H). When the third control signal of the wireless power transmission/reception circuit 214 is not WPT_EN=H, the processor 220 according to an embodiment may return to operation 810 to maintain the first mode.

In operation 850, the processor 220 according to an embodiment may identify the second mode corresponding to a Switch_EN=H && WPT_EN=H state based on the fact that the third control signal of the wireless power transmission/reception circuit 214 is WPT_EN=H, and may perform the operation of the wireless power reception mode or the first power transmission mode corresponding to the second mode until WPT_EN=L is obtained while the switch element 420 is maintained to be in an ON state in the second mode (second mode). For example, the processor 220 may identify that WPT_EN=L is obtained when the electronic device 201 is detached from the wireless power transmitter in the wireless power reception mode corresponding to the second mode. As another example, the processor 220 may identify that WPT_EN=L is obtained when the wireless power transmission is stopped during the first wireless power transmission mode (Phone to Phone {P2P}) corresponding to the second mode.

The processor 220 according to an embodiment may return to the first mode (ready mode) again when WPT_EN=L is obtained in the Switch_EN=H && WPT_EN=H state.

Figure 9A:
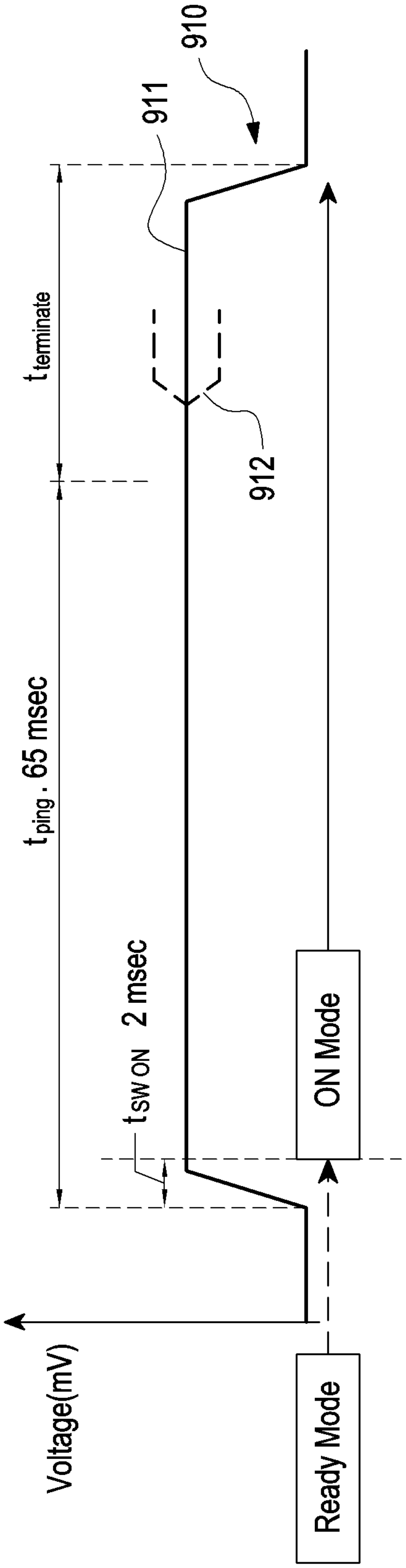
FIG. 9A is a diagram illustrating a time taken when an electronic device according to an embodiment is switched from a ready mode to an ON mode.
Figure 9B:
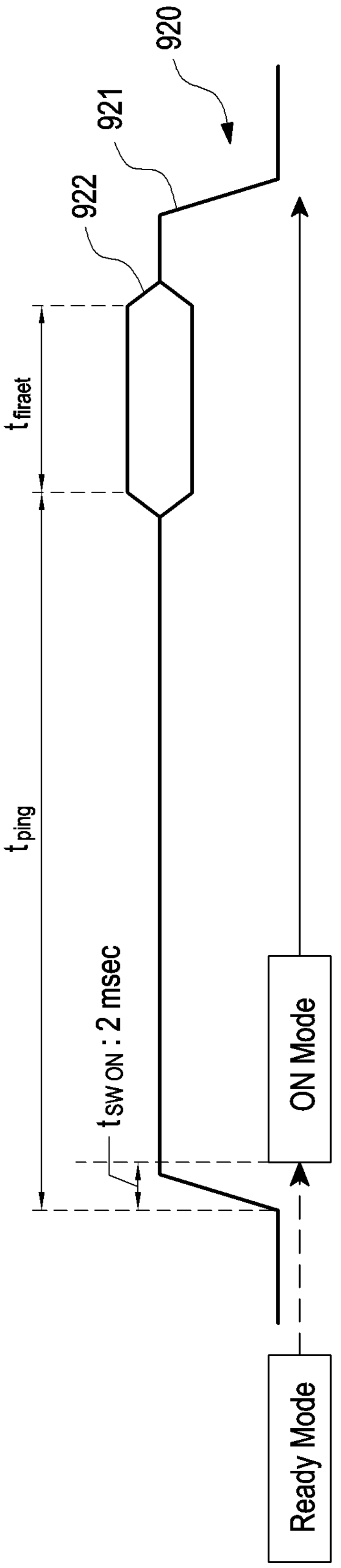
FIG. 9B is a diagram illustrating an example in which a packet is received within a designated time when an electronic device switches from a first mode to a second mode.

FIG. 9A is a diagram illustrating a time taken when an electronic device according to an embodiment is switched from a first mode to a second mode, and FIG. 9B is a diagram illustrating an example in which a packet is received within a designated time when an electronic device switches from a first mode to a second mode.

Referring to FIG. 9A, in a first graph 910 according to an embodiment, the horizontal axis may indicate voltage (mV) and the vertical axis may indicate time (ms). For example, the first graph 910 may be a graph indicating a voltage 912 of the switch circuit 211-7 when a transition from a first mode (ready mode) to a second mode (ON mode) is performed and then a packet signal (SSP) 911 is not received as a response to the transmission of the ping signal. When the electronic device 201 switches from the first mode (Ready mode) to the second mode (ON mode), a time tsw on may be 2 ms.

Referring to FIG. 9B, in a first graph 920 according to an embodiment, the horizontal axis may indicate voltage (mV) and the vertical axis may indicate time (ms). For example, the first graph 920 may be a graph indicating a voltage 922 of the switch circuit 211-7 when a transition from a first mode (ready mode) to a second mode (ON mode) is performed and then a packet signal (SSP) 921 is received as a response to the transmission of the ping signal.

According to the Qi specification of the WPC standard, since an external electronic device (e.g., a wireless power receiver) may wait for a designated time period (e.g., typing: 65 ms) after receiving the ping signal and before transmitting the first packet (SSP) signal, 2 ms, which is the time tsw on required for the electronic device 201 switching from the first mode (Ready mode) to the second mode (ON mode), may not affect the packet signal reception operation after the normal ping signal transmission.

According to an embodiment, the electronic device 201 may detect a voltage of the second coil 211-2 based on a threshold voltage (e.g., Vth) lower than a voltage threshold value (e.g., UVLO voltage) used by the wireless power transmission/reception circuit 214 in the first mode to detect an external electronic device, whereby the external electronic device may be detected with a low standby current (with low current consumption) without deterioration of the recognition area in the standby mode.

Table 3 below shows examples of a current consumed by the switch circuit 211-7 for detecting an external electronic device in the first mode and a current consumed by the switch circuit 211-7 for detecting an external electronic device in the second mode.

TABLE 3

| Operation mode | Switch circuit current consumption (iq) |
|---|---|
| First mode | About 30 μA |
| Second mode | About 1000 μA |

Referring to Table 3, the electronic device 201 according to an embodiment may reduce current consumption from about 1 mA to about 0.03 mA in the first mode than in the second mode. Assuming that the current consumption used in the standby mode by the electronic device 201 according to an embodiment is 7 to 8 mA, the current consumption efficiency may be improved by 10% or more. According to an embodiment, the electronic device 201 does not operate in the first mode and may detect an external electronic device using the first coil 211-1 with the switch element 420 turned off in the standby mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “1st” and “2nd”, or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), it means that the element may be coupled with the other element directly (e.g., wiredly), wirelessly, or via a third element.

As used in connection with the disclosure, the term “module” may include a unit implemented in hardware, software, or firmware, and may interchangeably be used with other terms, for example, “logic”, “logic block”, “part”, or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, in a non-volatile storage medium storing instructions, the instructions may enable, when executed by the at least one processor, the at least one processor to perform at least one operation. The at least one operation may include controlling a switch circuit of a multi-coil circuit including a first coil and a second coil to be switched on and controlling a wireless power transmission/reception circuit to be disabled based on a first mode, monitoring a voltage of the second coil, identifying whether the voltage of the second coil is equal to or greater than a designated threshold voltage, identifying a transition to a second mode based on the voltage of the second coil being equal to or greater than the designated threshold voltage, and maintaining a switched-on state of the switch circuit based on the identifying the transition to the second mode, and controlling the wireless power transmission/reception circuit to be enabled.

The embodiments of the disclosure in the present specification and drawings are merely provided for specific examples to easily explain the technical contents according to the embodiments of the disclosure and to help the understanding of the embodiments of the disclosure, but it is not intended to limit the scope of the embodiments of the disclosure. Therefore, in the scope of various embodiments of the disclosure, in addition to the embodiments disclosed herein, all changes or modifications derived from the technical ideas of various embodiments of the disclosure should be interpreted as being included in the scope of various embodiments of the disclosure.

What is claimed is:

1. An electronic device comprising:

a battery;

multi-coil circuitry including a first coil, a second coil, and a switch circuit connected between the first coil and the second coil, wherein the switch circuit includes a switch element and a voltage detector, wherein the switch element is electrically connected between the first coil and the second coil to connect in parallel or disconnect the first coil and the second coil, wherein the voltage detector is electrically connected between the second coil and the switch element;

wireless power transmission and reception circuitry electrically connected to the multi-coil circuitry;

power management circuitry electrically connected to the battery and the wireless power transmission and reception circuitry;

memory, comprising one or more storage media, storing instructions; and one or more processors electrically connected to the multi-coil circuitry, the wireless power transmission and reception circuitry, the power management circuitry, and the memory, wherein the instructions, when executed by the one or more processors individually or collectively, cause the electronic device to:

based on a first mode prior to wireless power transmission or reception of the electronic device, disable the wireless power transmission and reception circuitry and turn on the switch element so that the first coil and the second coil are connected to the wireless power transmission and reception circuitry, based on a second mode for wireless power reception or first wireless power transmission of the electronic device, enable the wireless power transmission and reception circuitry and turn on the switch element so that the first coil and the second coil are connected to the wireless power transmission and reception circuitry, and switch from the first mode to the second mode based on a voltage of the second coil detected by the voltage detector in the first mode being equal to or higher than a specified threshold voltage.

2. The electronic device of claim 1, wherein the instructions, when executed by the one or more processors individually or collectively, further cause the electronic device to:

based on a third mode for second wireless power transmission or power saving of the electronic device, enable the wireless power transmission and reception circuitry, and turn off the switch element so that the first coil is connected to the wireless power transmission and reception circuitry and the second coil is not connected to the wireless power transmission and reception circuitry.

3. The electronic device of claim 2, wherein a first control signal from the voltage detector is provided to the switch element when the voltage of the second coil is equal to or greater than a designated threshold voltage, and wherein the first control signal, a second control signal from the one or more processors, and a third control signal from the wireless power transmission and reception circuitry control the switch element to perform a switch-ON operation or a switch-OFF operation based on the first mode, the second mode, or the third mode.

4. The electronic device of claim 3, wherein the instructions, when executed by the one or more processors individually or collectively, further cause the electronic device to:

when the electronic device is in the first mode, control the second control signal to be high and the third control signal to be low.

5. The electronic device of claim 3, wherein the second control signal is high and the third control signal is high in the second mode.

6. The electronic device of claim 5, wherein, when the electronic device is in the second mode, based on the second control signal being high and the third control signal being high, the switch circuit is configured to connect the first coil and the second coil in parallel, and wherein the wireless power transmission and reception circuitry is configured to wirelessly receive power from an external electronic device through the first coil and second coil connected in parallel or wirelessly transmit first power to a first external electronic device.

7. The electronic device of claim 3, wherein the second control signal is low and the third control signal is high in a second wireless power transmission state within the third mode.

8. The electronic device of claim 7, wherein, when the electronic device is in the second wireless power transmission state within the third mode, based on the second control signal being low and the third control signal being high, the switch circuit is configured to disconnect the first coil and the second coil, and wherein the wireless power transmission and reception circuitry is configured to wirelessly transmit second power to a second external electronic device through the first coil.

9. The electronic device of claim 3, wherein; the second control signal is low and the third control signal is low when the electronic device is in a power saving state within the third mode.

10. The electronic device of claim 3, wherein, when the electronic device is in a power saving state within the third mode, based on the second control signal being low and the third control signal being low, the switch circuit is configured to disconnect the first coil, and wherein, when the electronic device is in the power saving state, based on the second control signal being low and the third control signal being low, the wireless power transmission and reception circuitry is configured to be in a disabled state.

11. A method for wireless power transmission and reception performed by an electronic device, the method comprising:

based on a first mode prior to wireless power transmission or reception of the electronic device, disabling a wireless power transmission and reception circuitry of the electronic device and turning on a switch element between a first coil and a second coil so that the first coil and the second coil are connected to the wireless power transmission and reception circuitry;

based on a second mode for wireless power reception or first wireless power transmission of the electronic device, enabling the wireless power transmission and reception circuitry and turning on the switch element so that the first coil and the second coil are connected to the wireless power transmission and reception circuitry; and switching from the first mode to the second mode based on a voltage of the second coil detected by a voltage detector electrically connected between the second coil and the switch element in the first mode being equal to or higher than a designated threshold voltage.

12. The method of claim 11, further comprising:

based on a third mode for second wireless power transmission or power saving of the electronic device, enabling wireless power transmission and reception circuitry, and turning off the switch element so that the first coil is connected to the wireless power transmission and reception circuitry and the second coil is not connected to the wireless power transmission and reception circuitry.

13. The method of claim 12, wherein a first control signal from the voltage detector is provided to the switch element when the voltage of the second coil is equal to or greater than the designated threshold voltage; and wherein the first control signal, a second control signal from one or more processors of the electronic device, and a third control signal from the wireless power transmission and reception circuitry control the switch element to perform a switch-ON operation or switch-OFF operation based on the first mode, the second mode, or the third mode.

14. The method of claim 13, when the electronic device is in the first mode, controlling the second control signal to be high and the third control signal to be low.

15. The method of claim 13, wherein the second control signal is high and the third control signal is high in the second mode.

16. The method of claim 15, further comprising:

controlling, by the electronic device, the second control signal to be high and the third control signal to be high while the electronic device is in the second mode; and controlling, by the electronic device, the first coil and the second coil to be connected in parallel through a switch circuit and controlling, by the electronic device, the wireless power transmission and reception circuitry to receive power from an external electronic device or transmit first power to a first external electronic device through the first coil and the second coil connected in parallel based on the second control signal being high and the third control signal being high.

17. The method of claim 13, wherein the second control signal is low and the third control signal is high in a second wireless power transmission state within the third mode.

18. The method of claim 17, further comprising:

controlling, by the electronic device, the second control signal to be low and the third control signal to be high while the electronic device is in the second wireless power transmission state within the third mode; and controlling, by the electronic device, a parallel connection of the first coil and the second coil to be released and controlling, by the electronic device, the wireless power transmission and reception circuitry to wirelessly transmit second power to a second external electronic device through the first coil based on the second control signal being low and the third control signal being high.

19. The method of claim 13, wherein the second control signal is low and the third control signal is low when the electronic device is in a power saving state within the third mode.

20. The method of claim 19, further comprising:

controlling, by the electronic device, the second control signal to be low and the third control signal to be low while the electronic device is in the power saving state within the third mode; and controlling, by the electronic device, a parallel connection of the first coil and the second coil to be released and controlling, by the electronic device, the wireless power transmission and reception circuitry to be disabled based on the second control signal being low and the third control signal being low.

* * * * *